United States Patent [19]

Barenberg et al.

[11] 4,378,444

[45] Mar. 29, 1983

[54] MOLDING MATERIAL

[75] Inventors: Sumner A. Barenberg; Frank P. Gay, both of Hockessin, Del.

[73] Assignee: E. I. Du Pont de Nemours and Company, Wilmington, Del.

[21] Appl. No.: 377,372

[22] Filed: May 12, 1982

[51] Int. Cl.³ .................. C08K 5/43; C08L 67/02
[52] U.S. Cl. .................... 524/169; 525/176; 260/DIG. 35
[58] Field of Search ............... 524/169; 525/176; 260/DIG. 35

[56] References Cited

U.S. PATENT DOCUMENTS

| | | | |
|---|---|---|---|
| 3,435,093 | 3/1969 | Cope | 525/176 |
| 3,639,527 | 2/1972 | Brinkmann | 525/176 |
| 4,294,938 | 10/1981 | Berr | 525/101 |
| 4,303,572 | 12/1981 | Ostapchenko | 525/64 |
| 4,327,199 | 1/1981 | Coran | 525/176 |

*Primary Examiner*—Allan Lieberman
*Assistant Examiner*—P. Short

[57] ABSTRACT

Use of a selected sulfonamide has been found to reduce mold deposits and to lower volatility without impairing crystallization rates of polyethylene terephthalate molding blend which contains an ionic hydrocarbon copolymer or ionic salt of a hydrocarbon acid, over polyethylene terephthalate blends which contained the ionic component and other additives.

7 Claims, No Drawings

MOLDING MATERIAL

FIELD OF THE INVENTION

This invention relates to polyethylene terephthalate molding blends.

BACKGROUND OF THE INVENTION

Historically, polyethylene terephthalate has been difficult to mold at molding temperatures below about 110° C. because its crystallization rate is so slow and uneven that warped articles are obtained. Moreover, the articles tend to stick to the mold and are difficult to remove. Recently, it has been found that polyethylene terephthalate articles of good quality can be obtained by molding at lower temperatures, e.g., 80°–100° C., if certain materials are added to the resin prior to molding. These additive materials increase the rate of crystallization, and molded articles having smooth glossy surfaces that are easily removable from molds, are obtained when the materials are employed. The additive materials are (1) a sodium or potassium salt of a selected hydrocarbon acid or a sodium or potassium salt of a selected organic polymer containing pendant carboxyl groups and (2) a selected low molecular weight organic compound that is an ester, ketone, sulfone, sulfoxide, nitrile or amide.

However, many of these low molecular weight organic compounds are somewhat volatile at molding temperatures and tend to vaporize and redeposit on the mold surfaces. It would be advantageous to find a low molecular weight organic compound that does not so vaporize and redeposit.

SUMMARY OF THE INVENTION

It is the purpose of this invention to provide unreinforced, filled or reinforced polyethylene terephthalate molding blends that can be molded into articles having a smooth, glossy surface, and which do not leave mold deposits and/or are not volatile during molding operations.

It has been found that certain para-n-alkyl toluene sulfonamides possess low volatility and can be employed as the low molecular weight component of the fast-crystallizable polyethylene terephthalate molding resins described above. The para-n-alkyl toluene sulfonamides have the formula

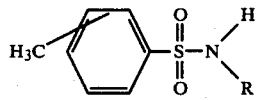

wherein R is n-alkyl or n-alkenyl of 14–16 carbon atoms, or if a mixture of sulfonamides is present, R can contain 14–18 carbon atoms provided that the sulfonamide in which R is 18 carbon atoms is present in an amount less than 70% by weight of the total sulfonamides present.

More specifically, the polyethylene terephthalate molding blends of this invention are defined as (a) 20–90% by weight of blend of polyethylene terephthalate having an inherent viscosity of at least 0.4 dl/g.

(b) 0–50% by weight of blend of a reinforcing or filling material.

(c) 1–10% by weight of blend of at least one sodium or potassium salt of a hydrocarbon carboxylic acid of 7–25 carbon atoms or at least one sodium or potassium salt of an ionic hydrocarbon copolymer of an α-olefin of 2–5 carbon atoms and an α,β-ethylenically unsaturated carboxylic acid of 3–5 carbon atoms in which the carboxyl groups have been at least partially neutralized with Na+ or K+ cations, provided the amount of copolymer present is sufficient to provide a $\Delta H_H/\Delta H_c$ ratio of less than 0.25 to a blend of (a), (b), and (c).

(d) 1–10% by weight of blend of at least one p-n-alkyl toluene sulfonamide of the formula

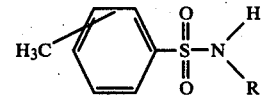

wherein R is defined as above, provided the amount of the sulfonamides present is sufficient to lower the TpK of a blend of (a), (b), and (c) at least about 4° C.

The p-n-alkyl toluene sulfonamides in the above blends have been found to show: (1) low volatility at high processing temperatures, (2) lowering of the cold crystallization exotherm of PET, thusly allowing for lower mold temperatures, (3) no apparent loss of mechanical properties in the blend, (4) minimal ester interchange and (5) good thermal stability of the blends.

DESCRIPTION OF THE INVENTION

The Polyethylene Terephthalate

The polyethylene terephthalate employed herein is done which has an inherent viscosity of at least 0.4 dl/g as measured by ASTM D-2857. The polyethylene terephthalate preferably has an upper limit on inherent viscosity of about 1.2. Inherent viscosity is measured in a 3:1 by volume ratio of methylene chloride and trifluoroacetic acid at 30° C. The polyethylene terephthalate can contain up to 50% by weight of other comonomers such as diethylene glycol, glutaric acid, polybutylene terephthalate, polyalkylene oxide, cyclohexane dimethanol, and other diols. Preferably the polyethylene terephthalate is present in an amount between 35 and 70% by weight of blend.

The Reinforcing or Filler Material

The reinforcing or filler material which may be employed herein includes glass fibers, graphite fibers, aramid fibers, glass beads, aluminum silicte, asbestos, mica, and the like, and combinations of them. The material is preferably present in an amount of between 15 to 50 percent by weight of blend.

The Sodium or Potassium Salt of a Hydrocarbon Carboxylic Acid or an Ionic Hydrocarbon Copolymer Representative acids for the sodium or potassium salts of a hydrocarbon carboxylic acid are stearic, pelargonic and behenic acids. Representatives of the ionic hydrocarbon copolymer are the salts of copolymers of olefins and acrylic or methacrylic acids, or copolymers of aromatic olefins and maleic anhydride. Preferably these materials include the sodium or potassium salt of stearic acid; the sodium or potassium salt of ethylene/-methacrylic acd copolymers (including both wholly or partially neutralized salts e.g., at least about 30% neutralized), the sodium salt of styrene/maleic anhydride copolymers (including both wholly or partially neutralized salts e.g., at least about 30% neutralized) and sodium versatate. In the copolymers listed above the olefin or aromatic olefin moiety ordinarily comprises 50–98 percent by weight of the copolymer, and preferably 80–98 percent. An especially preferred material is the sodium salt of ethylene/methacrylic acid copolymer. The copolymers may be prepared by conventional high pressure polymerization technology.

The p-n-Alkyl Toluene Sulfonamide

The sulfonamide can contain minor proportions of closely related sulfonamides without affecting the results obtained. For example, some (up to perhaps about 40% by weight) of the —CH₃ groups may be in the ortho position rather than the para position. Moreover sulfonamides wherein R contains 12 carbons or less or 18 carbons or more may be present provided at least about 30% of the sulfonamides present are ones in which R contains 14 or 16 carbons. Preferably, the sulfonamide will be either the one wherein R is n-alkyl of 14 carbons, or a mixture of sulfonamides wherein R is a mixture of $C_{14}$, and $C_{16}$ and $C_{18}$ alkyl or alkenyl groups in which the amount of the $C_{18}$ compound is not over 70% by weight of the mixture.

The salt and the sulfonamides aid in obtaining molded articles of high surface gloss at molding temperatures below 110° C. by increasing the rate of crystallization of polyethylene terephthalate. The salt is believed to primarily aid in increasing the rate of crystallization while the sulfonamide is believed to primarily improve the mobility of the polyethylene terephthalate in its melted state by reducing the viscosity of the polymer mixture. Both are necessary to obtain the high gloss found in the articles molded from the composition. The sulfonamide is necessary to lower the amount of mold deposits formed.

The amount of the salt present is an amount which will result in a $\Delta H_H/\Delta H_c$ ratio, of the blend less than 0.25. To find the $\Delta H_H/\Delta H_c$ polyethylene terephthalate is cold molded into 1/16″ thick bars. The bars are heated at a rate of 10° C. per minute and at between 95° C. and 120° C. an exotherm (termed $\Delta H_H$) is recorded on a differential scanning calorimeter (DSC) cell attached to a Du Pont 900 Differential Thermal Analysis (DTA) device. The bar is heated to 290° (which is above its melting point) and the melted sample cooled at 10° C./minute. Another exotherm at between about 200°–225° C. (termed $\Delta H_c$) is the exotherm recorded on freezing of the sample. It has been found that the $\Delta H_H/\Delta H_c$ ratio is a convenient method of measuring the degree of crystallization.

The TpK of the blends is the temperature at which heat evolves most rapidly during the heating cycle recited in the previous paragraph. The amount of the low molecular weight compound present in the blend is an amount which lowers the Tpk of the blend by at least 4° C. over that of an identical blend that does not contain the compound.

In general the salt and the sulfonamide will both be present in amounts of 1–10% and preferably 2.5–6.0% by weight of blend.

Other Additives

In addition to the components discussed hereinabove, the blends of this invention may contain additives commonly employed with polyester resins, such as colorants, mold release agents, antioxidants, tougheners, nucleating agents, ultraviolet light and heat stabilizers and the like.

Preparation

The blends of this invention are prepared by blending the components together by any convenient means to obtain an intimate blend. Neither temperature nor pressure are critical. For example, the polyethylene terephthalate can be mixed dry in any suitable blender or tumbler with the other components and the mixture melt-extruded. The extrudate can be chopped. If desired the reinforcing or filling agent can be omitted initially and added after the first melt extrusion, and the resulting mixture can then be melt extruded.

EXPERIMENTS

In the Experiments which follow, percents are based on total blend unless otherwise noted.

$\Delta H_H/\Delta H_c$ and Tpk are determined as described above.

TGA volatility values were determined by finding the intersection of the extrapolation of the base line with the extrapolatin of the inflexion on a graph of weight loss versus temperature, at a heating rate of 10° C. per minute.

EXAMPLES

Extrudates were prepared by (1) feeding dry mechanical blends of The Basic Composition (described below) to a 28 mm Werner and Pfleiderer twin screw extruder. Extruded strands were cut into pellets and dried overnight prior to molding. The final dried pellets were injected molded into test bars using a 6 oz. Van Dorn reciprocating screw molding machine using a fast ram speed, barrel temperatures of 285° C. and a cold mold. The compositions differed only in the nature of the sulfonamides as indicated in Table I.

Property Measurement

Properties were measured using either the extrudate pellets or the injection molded bars as described above. Examples were tested in the dry as molded state without moisture conditioning. The heats of crystallization, Tpk, were obtained by differential scanning calorimetry as described above. The volatility was obtained by thermogravimetric analysis using the extrudate pellets and/or dry as molded 1/16″ test bars. The results are shown in Table I.

Basic Composition (% by weight of blend)

88.5% polyethylene terephthalate of inherent viscosity of 0.6

5.4% copolymer of ethylene/methacrylic acid (85/15 by weight), 60% neutralized with sodium ions 0.44% tetrabis[methylene(3,5-di-tert-butyl-4-hydroxyhydrocinnamate)] methane (an antioxidant)

5.66% sulfonamide described in Table I below

TABLE I*

| Comparison (Letter) or Example (number) | R | TGA °C. | Tpk °C. |
|---|---|---|---|
| A | p-$C_{18}$ | 262 | 107 |
| B | p-$C_8$ | 180 | 103.5 |
| C | p-$C_{12}$ | 214 | 102 |
| 1 | p-$C_{14}$ | 255 | 101.5 |
| 2 | $C_{14}/C_{18}$ | 238/260 | 101 |
| 3 | $C_{16}/C_{18}$ (Unsat) | 260 | 102 |
| 4 | $C_{16}/C_{18}$ | 260 | 102 |

TABLE I*-continued

| Comparison (Letter) or Example (number) | R | TGA °C. | Tpk °C. |
|---|---|---|---|
| | (Saturated) | | |

*The sulfonamide had the formula

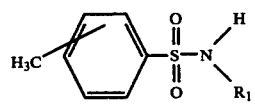

In Examples 3 and 4, the —CH₃ of the sulfonamide was an ortho/para mixture (on the order of 30% ortho/70% para).

In Examples 3, 4 and 5, the amount of the $C_{18}$ compound present was not over 70% by weight of the total sulfonamides present.

It was found that a volatility exemplified by TGA of 215° C. or less causes undesirable deposits of the prior art low molecular weight organic compound in the manufacturing equipment. It was also found that an acceptable Tpk value is 104° C. or less. Thus it can be seen from Table I that the $C_{18}$ (R) chain sulfonamide, although satisfactory from a volatility standpoint, is not satisfactory in promoting crystal growth (because of its high Tpk). On the other hand, substitution of up to 35 percent of the $C_{14}$ or $C_{16}$ analog shows a dramatic reduction in the Tpk (examples 2–4) and thus an improvement in crystal growth promotion. Comparative Examples B and Example 1 together show that a relatively small decrease in volatility as measured by TGA. On the other hand, the TGA of the $C_{12}$ sulfonamide (Comparison C) was too low.

We claim:

1. A polyethylene terephthalate molding blend consisting essentially of
   (a) 20–90% by weight of blend of polyethylene terephthalate having an inherent viscosity of at least 0.4 dl/g,
   (b) 0–50% by weight of blend of a reinforcing or filling material,
   (c) 1–10% by weight of blend of at least one sodium or potassium salt of a hydrocarbon carboxylic acid of 9–25 carbon atoms or at least one sodium or potassium salt of an ionic hydrocarbon copolymer of an α-olefin of 2–5 carbon atoms and an α,β-ethylenically unsaturated carboxylic acid of 3–5 carbon atoms in which the carboxyl groups have been at least partially neutralized with Na⁺ or K⁺ cations, provided the amount of copolymer present is sufficient to provide a $\Delta H_H/\Delta H_c$ ratio of less than 0.25 to the blend,
   (d) 1–10% by weight of blend of at least one para-n-alkyl toluene sulfonamide of the formula

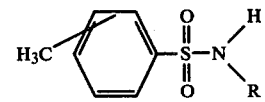

wherein R is n-alkyl or n-alkenyl of 14–16 carbon atoms, or if a mixture of sulfonamides is present, R can contain 14–18 carbon atoms provided that the sulfonamide in which R is 18 carbon atoms is present in an amount less than 70% by weight of the total sulfonamides present,
provided also that the amount of sulfonamide present is sufficient to lower the Tpk of a blend of (a), (b) and (c) by at least about 4° C.

2. The blend of claim 1 wherein the reinforcing or filling material is present in an amount of between about 15 and 50 percent by weight of blend and is glass fiber.

3. The blend of claim 1 wherein component (c) is a sodium or potassium salt of the ionic hydrocarbon copolymer defined in claim 1.

4. The blend of claim 3 wherein the sodium or potassium salt is the salt of a copolymer of an olefin and acrylic or methacrylic acid.

5. The blend of claims 1, 2, 3 or 4 wherein the sulfonamide is one in which R is n-alkyl of 14–16 carbon atoms.

6. The blend of claims 1, 2, 3 or 4 wherein the sulfonamide is a mixture of sulfonamides in which R is alkyl of 14, 16 and 18 carbon atoms in which the amount of the sulfonamide wherein R is 18 is not over 70% by weight of the total weight of the sulfonamides present.

7. The blend of claim 1 in the form of a melt-extruded blend.

* * * * *